US012676373B2

(12) United States Patent
Qiu et al.

(10) Patent No.: US 12,676,373 B2
(45) Date of Patent: Jul. 7, 2026

(54) BATTERY PACK AND VEHICLE

(71) Applicant: EVE POWER CO., LTD., Jingmen (CN)

(72) Inventors: Wencong Qiu, Jingmen (CN); Fan Li, Jingmen (CN); Zhiwei Chen, Jingmen (CN); Zhaohai Chen, Jingmen (CN); Yanqiang Feng, Jingmen (CN)

(73) Assignee: EVE POWER CO., LTD., Jingmen (CN)

( * ) Notice: Subject to any disclaimer, the term of this patent is extended or adjusted under 35 U.S.C. 154(b) by 712 days.

(21) Appl. No.: 18/002,816

(22) PCT Filed: Oct. 20, 2022

(86) PCT No.: PCT/CN2022/126338
§ 371 (c)(1),
(2) Date: Dec. 21, 2022

(87) PCT Pub. No.: WO2023/173739
PCT Pub. Date: Sep. 21, 2023

(65) Prior Publication Data
US 2024/0120592 A1 Apr. 11, 2024

(30) Foreign Application Priority Data

Apr. 20, 2022 (CN) ......................... 202210420095.7
Apr. 20, 2022 (CN) ......................... 202220922718.6

(51) Int. Cl.
*H01M 50/213* (2021.01)
*B60L 50/60* (2019.01)
(Continued)

(52) U.S. Cl.
CPC ........... *H01M 50/213* (2021.01); *B60L 50/64* (2019.02); *B60L 50/66* (2019.02); *H01M 10/613* (2015.04);
(Continued)

(58) Field of Classification Search
CPC . H01M 50/213; H01M 50/233; H01M 10/613
See application file for complete search history.

(56) References Cited

U.S. PATENT DOCUMENTS

2020/0153057 A1* 5/2020 Wynn ..................... H01M 4/70
2020/0358049 A1* 11/2020 Shi ...................... H01M 50/209
2022/0059901 A1 2/2022 Ren

FOREIGN PATENT DOCUMENTS

CN 206332064 U 7/2017
CN 110718726 A 1/2020
(Continued)

OTHER PUBLICATIONS

Machine Translation of CN 216085146 U. (Year: 2022).*
(Continued)

*Primary Examiner* — Jonathan G Jelsma
(74) *Attorney, Agent, or Firm* — PV IP PC; Christopher S. Ruprecht; Wei Te Chung

(57) ABSTRACT

A battery pack and a vehicle are provided. The battery pack includes a base plate assembly, a side beam assembly, and at least one battery cell group. The side beam assembly is disposed at an outer periphery of the base plate assembly. The side beam assembly and the base plate assembly define an accommodating cavity, and the accommodating cavity includes at least one installation area. The installation area is provided with the battery cell group. The battery cell group includes a plurality of battery cells, and the plurality of battery cells are fixedly disposed on the base plate assembly. According to the battery pack and the vehicle, each battery cell is fixedly disposed on the base plate assembly in the installation area. The plurality of the battery cells disposed in installation area defines a battery cell group.

18 Claims, 6 Drawing Sheets

(51) Int. Cl.
    *B60L 50/64*        (2019.01)
    *H01M 10/613*    (2014.01)
    *H01M 10/625*    (2014.01)

(52) U.S. Cl.
    CPC ...... *H01M 10/625* (2015.04); *H01M 2220/20*
                                   (2013.01)

(56)             References Cited

FOREIGN PATENT DOCUMENTS

| CN | 211828940 U | | 10/2020 | | |
|----|-------------|---|---------|-----|----------|
| CN | 212571202 U | | 2/2021 | | |
| CN | 113140852 A | | 7/2021 | | |
| CN | 113540615 A | * | 10/2021 | ......... | H01M 10/617 |
| CN | 113540651 A | | 10/2021 | | |
| CN | 215527801 U | | 1/2022 | | |
| CN | 114006124 A | | 2/2022 | | |
| CN | 216085146 U | * | 3/2022 | | |
| CN | 114865193 A | | 8/2022 | | |
| DE | 202021107025 U1 | | 3/2022 | | |
| EP | 2506336 A1 | | 10/2012 | | |
| JP | 2021077598 A | | 5/2021 | | |
| KR | 20210133537 A | | 11/2021 | | |
| WO | 2021208969 A1 | | 10/2021 | | |
| WO | 2021256878 A1 | | 12/2021 | | |

OTHER PUBLICATIONS

Machine Translation DE 202021107025 U. (Year: 2020).*
International Search Report in International application No. PCT/CN2022/126338, mailed on Jan. 11, 2023.
Written Opinion of the International Search Authority in International application No. PCT/CN2022/126338, mailed on Jan. 11, 2023.
European Search Report in European application No. 22817513.9, mailed on Aug. 30, 2024.
European Search Report in European application No. 22817513.9, mailed on Feb. 7, 2025.

\* cited by examiner

A-A

BATTERY PACK AND VEHICLE

CROSS-REFERENCE TO RELATED APPLICATIONS

This application is a national stage of International Application No. PCT/CN2022/126338, filed on Oct. 20, 2022, which claims priority to Chinese Patent Application No. 202210420095.7, filed on Apr. 20, 2022 and Chinese Patent Application No. 202220922718.6, filed on Apr. 20, 2022. All of the aforementioned applications are hereby incorporated by reference in their entireties.

TECHNICAL FIELD

The present application relates to the technical field of power batteries, for example, to a battery pack and a vehicle.

BACKGROUND

In related arts, a battery pack includes a casing, and a plurality of battery modules disposed in the casing. Each of the plurality of battery modules includes a plurality of battery cells, and a housing configured to encapsulate the plurality of battery cells. The plurality of battery modules are connected to the casing and structures in the casing through a sharing boundary. Since the battery module includes structures such as housing and the like, numerous parts and components are provided. Therefore, cost and occupied space are increased, and energy density of the battery pack is reduced.

SUMMARY

A battery pack and a vehicle are provided in the present application. Battery cell in the battery pack are arranged in groups to realize cell to pack, which simplifies structures of the battery cell groups. As such, it reduces the cost, and improves energy density of the battery pack.

In a first aspect, an embodiment of the present application provides a battery pack, including:

a base plate assembly;

a side beam assembly, wherein the side beam assembly is disposed at an outer periphery of the base plate assembly, the side beam assembly and the base plate assembly define an accommodating cavity, and the accommodating cavity includes at least one installation area; and at least one battery cell group, wherein the installation area is provided with one of the battery cell group, the battery cell group includes a plurality of battery cells and the plurality of battery cells are fixedly disposed on the base plate assembly.

In an embodiment, the battery pack further includes a frame assembly disposed in the accommodating cavity and configured to divide the accommodating cavity into at least two installation areas.

In one embodiment, the frame assembly includes one or more of first crossbeams, and under a condition that a quantity of the at least one first crossbeam is plurality, a plurality of crossbeams are arranged in parallel and spaced from each other to divide the accommodating cavity into a plurality of installation areas.

In one embodiment, the frame assembly further includes a longitudinal beam, the longitudinal beam and the at least one first crossbeam define a cross beam, and the cross beam is configured to divide the accommodating cavity into the plurality of installation areas.

In one embodiment, the battery pack further includes an electrical component, wherein the frame assembly includes a second crossbeam, and the second crossbeam divides the accommodating cavity into a first area and a second area, the at least two installation areas are provided in the first area, and the electrical component is disposed in the second area.

In one embodiment, the battery pack further includes a wire harness module disposed on a side of the battery cell group away from the base plate assembly, and the wire harness module is electrically connected to the battery cell group In one embodiment, the battery pack further includes a liquid cooling plate, and the liquid cooling plate is bonded to a side of the wire harness module away from the battery cell group.

In one embodiment, when the accommodating cavity is divided into a first area and a second area, the first area includes a plurality of installation areas, and a support plate is disposed on the second area;

the bottom plate assembly includes an outer plate and an inner plate, the outer plate and the inner plate define a first pressure relief cavity, and the battery cell of the battery cell group seal a part of a cavity wall of the first pressure relief cavity;

the support plate and the inner plate define a second pressure relief cavity, and the second pressure relief cavity is communicated with another part of the cavity wall of the first pressure relief cavity; and an inner cavity of the side beam assembly defines a third pressure relief cavity, the second pressure relief cavity is communicated with the third pressure relief cavity, and a pressure relief valve communicated the third pressure relief cavity is installed on the side beam assembly.

In one embodiment the inner plate includes a carrier board and a partition board, and the battery cell seals on a side of a first through-hole defined in the carrier board, the partition plate and the support plate define the second pressure relief cavity, and the second pressure relief cavity is communicated with the first pressure relief cavity via a second through-hole provided in the partition plate.

In one embodiment, a filter screen plate is disposed on the second through-hole defined in the partition plate.

In one embodiment, a partition wall is disposed in the third pressure relief cavity, and the partition wall is configured to divide the third pressure relief cavity into a plurality of cavities communicated with each other.

In one embodiment, the battery pack further a plurality of installation base assemblies, and the battery cell is disposed on the base plate assembly through a corresponding one of the plurality of installation base assemblies.

In one embodiment, each of the plurality of the installation base assemblies includes a lower cover, the lower cover has a limiting groove configured to accommodate the battery cell, a connecting portion is provided on a side of the lower cover away from the battery cell, and the lower cover is fixedly disposed on the base plate assembly through the connecting portion.

In one embodiment, a first adhesive storage groove is defined in the lower cover the first adhesive storage groove is configured to accommodate structural adhesive, and the battery cell is bonded to the lower cover through the structural adhesive; and/or a second adhesive storage groove is defined in the lower cover, the second adhesive storage groove is configured to accommodate structural adhesive, and the lower cover is bonded to the base plate assembly through the second structural adhesive.

In one embodiment, the base plate assembly includes a carrier plate and the lower cover is disposed on the carrier plate.

In one embodiment, a first electrode and a second electrode of the battery cell are disposed on a same side of the battery cell; and the installation base assembly further includes an upper cover arranged opposite to the lower cover, the upper cover is disposed on a side of the battery cell where the first electrode and the second electrode are disposed, the first electrode and the second electrode are exposed from the upper cover, and connect a wire harness module in the battery pack.

In one embodiment, the upper covers is snapped with the upper cover adjacent thereto.

In a second aspect, an embodiment of the present application provides a vehicle, including the above-mentioned battery pack.

Beneficial effects of the present application are as follows:

According to the battery pack and the vehicle in the present application, each of the battery cells is fixedly disposed on the base plate assembly in the installation area. A battery cell group is defined by a plurality of battery cells disposed in a same installation area. The battery cells are de-modularized and assembled into groups, thereby reducing a number of parts, lowing costs, reducing volume, and improving energy density of the battery pack.

Figure 1:
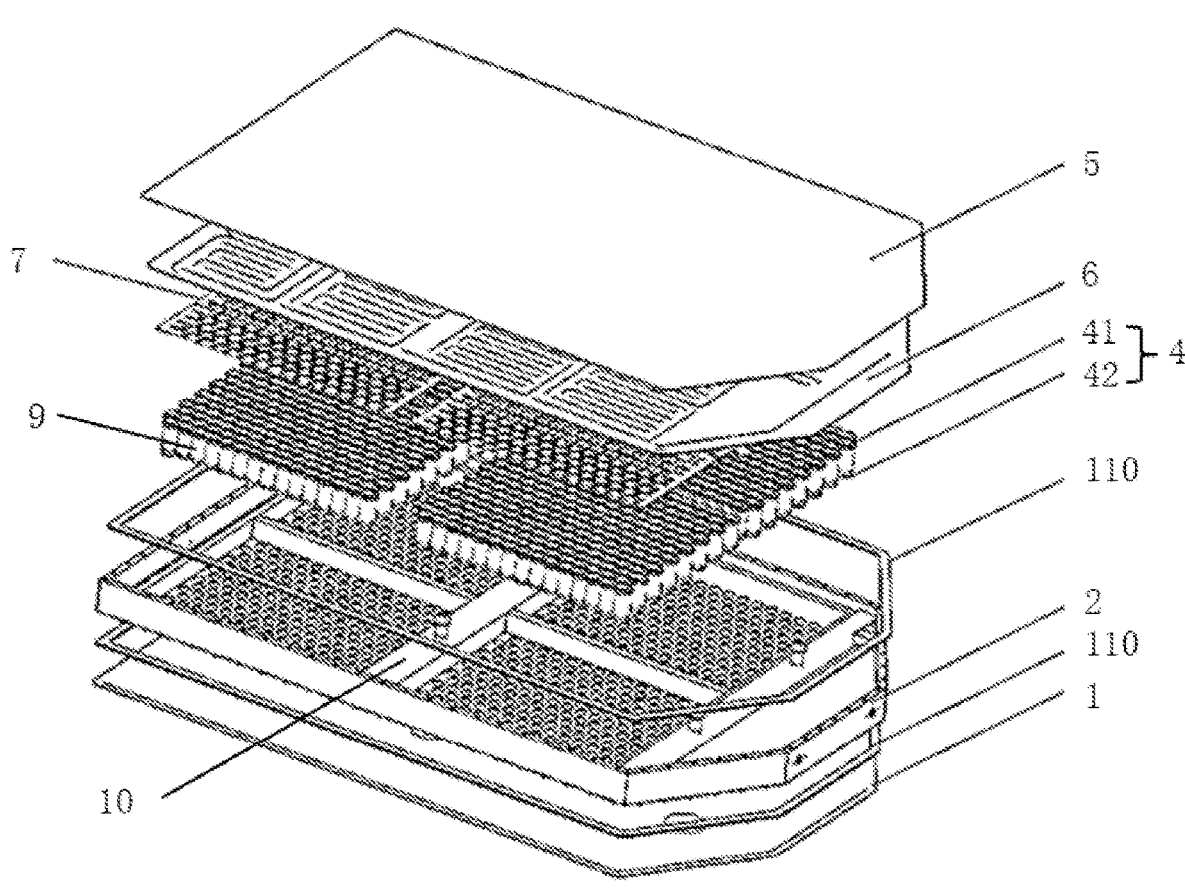
FIG. 1 is a schematic exploded diagram of a battery pack provided by an embodiment of the present application.
Figure 2:
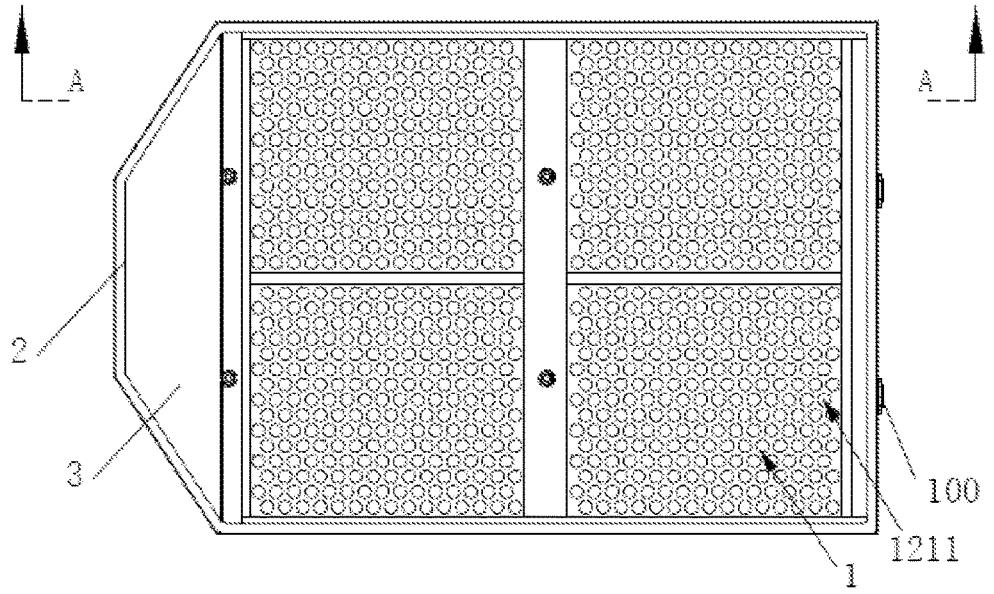
FIG. 2 is a schematic structural diagram of a part of a battery pack provided by the embodiment of the present application in a viewing.

REFERENCE NUMERALS 1, bottom plate assembly; 11, outer plate; 12, inner plate; 121, carrier board; 1211, first through-hole; 122, partition board; 1A, first pressure relief cavity;

2, side beam assembly; 21, partition wall; 22, first side beam; 23, second side beam; 231, horizontal side beam; 2311, pressure relief hole; 232, vertical side beam; 24, third side beam; 25, fourth side beam; 2a, third pressure relief cavity;

3, support plate; 3A, second pressure relief cavity;

4, installation base assembly; 41, upper cover; 411, first annular sleeve; 412, second annular sleeve; 413, connection board; 414, baffle; 415, second buckle; 416, second clamp slot; 42, lower cover; 421, limiting groove; 422, first buckle; 423, first adhesive storage groove; 424; second adhesive storage groove; 425, limiting protrusion; 426, bottom plate; 427, side plate;

5, top plate assembly; 6, liquid cooling plate; 7, wiring harness module;

81, installation strip; 82, fastener; 83, fixing part;

9, battery cell group; 91, battery cell; 911, first electrode; 912, second electrode;

10, frame assembly; 101, first crossbeam; 102, longitudinal beam; 103, second crossbeam;

100, pressure relief valve; 110, sealing strip;

M, first area; N, second area.

DETAILED DESCRIPTION OF THE EMBODIMENTS

In the description of the present application, unless otherwise specified and limited, the terms "connected to each other", "connect" or "fix" are to be construed in a broad sense, for example, as fixedly connected, detachably connected, or integrated; mechanically connected or electrically connected; directly connected to each other or indirectly connected to each other via an intermediary; or internally connected between two elements or interacted between two elements. Meanings of the preceding terms in the present application may be understood according to situations by an ordinary person in the art.

In the present application, unless otherwise specified and limited, when a first feature is described as "on" or "below" a second feature, the first feature and the second feature may be in direct contact, or be in contact via another feature between the two features instead of being in direct contact. Moreover, when the first feature is described as "on", "above" or "over" the second feature, the first feature is right on, above or over the second feature or the first feature is obliquely on, above or over the second feature, or the first feature is simply at a higher level than the second feature. When the first feature is described as "under", "below" or "underneath" the second feature, the first feature is right under, below or underneath the second feature, or the first feature is obliquely under, below or underneath the second feature, or the first feature is simply at a lower level than the second feature.

A vehicle including a battery pack is provided in the embodiments. A battery pack is provided in the embodiments, which contributes to reducing cost and the volume of the battery pack for a better layout in the vehicle, and improving the energy density of the battery pack.

As shown in FIGS. 1, 2, 7, and 9, the battery pack 100 includes a base plate assembly 1, a side beam assembly 2, and a plurality of battery cell groups 9. The side beam assembly 2 is disposed at an outer periphery of the base plate assembly 1. The side beam assembly 2 and the base plate assembly 1 define an accommodating cavity, and the accommodating cavity includes at least one installation area. At least one battery cell group 9 is provided. The number of the battery cell groups 9 is corresponding to the number of the installation areas. Each of the installation areas is provided with the battery cell group 9. The battery cell group 9 includes a plurality of battery cells 91, and each of plurality of the battery cells 91 is fixedly disposed on the base plate assembly 1.

Each of the battery cells 91 is fixedly disposed on the base plate assembly 1 in the installation area. A plurality of the battery cells 91 disposed in a same installation area define a battery cell group 9. The battery cells 91 are de-modularized and assembled into groups, which reduces the number of parts, lowers costs, reduces volume, and improves energy density of the battery pack. In an embodiment, the battery pack includes one or more of battery cell groups 9, and the number of the battery cell groups 9 is not limited in the embodiment.

As shown FIG. 1, the battery pack includes a top plate assembly 5, and the top plate assembly 5 is disposed on a side of the side beam assembly 2 away from the base plate assembly 1. The battery cell group 9 is disposed between the top plate assembly and the bottom plate assembly. The top plate assembly 5, the base plate assembly 1, and the side beam assembly 2 are connected to define a battery casing. A sealing strip 110 is disposed between the top plate assembly 5 and the side beam assembly 2, and between the base plate assembly 1 and the side beam assembly 2 to seal the battery casing.

As shown in FIG. 1, the battery pack further includes a frame assembly 10, the frame assembly 10 is disposed in the accommodating cavity to divide the accommodating cavity into at least two installation areas. The frame assembly 10 is provided to separate the installation areas, interference between structures of different areas is prevented. The frame assembly 10 is disposed in the battery casing, which improves structural strength of the battery casing.

Figure 3:
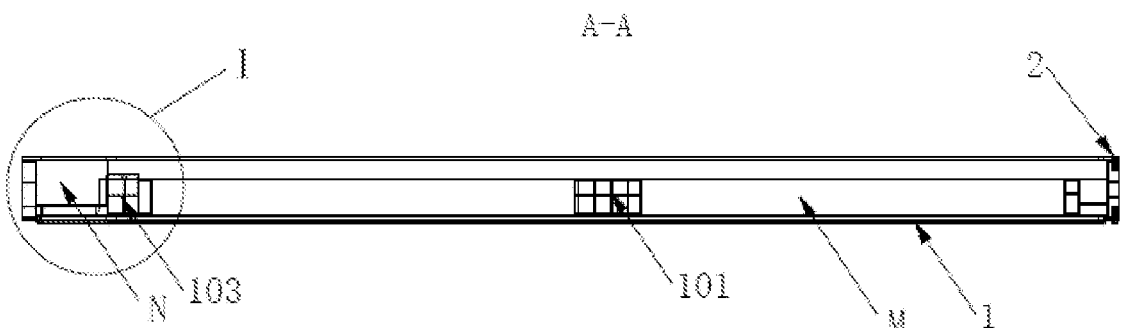
FIG. 3 is a schematic sectional diagram of FIG. 2 taken along A-A.
Figure 4:
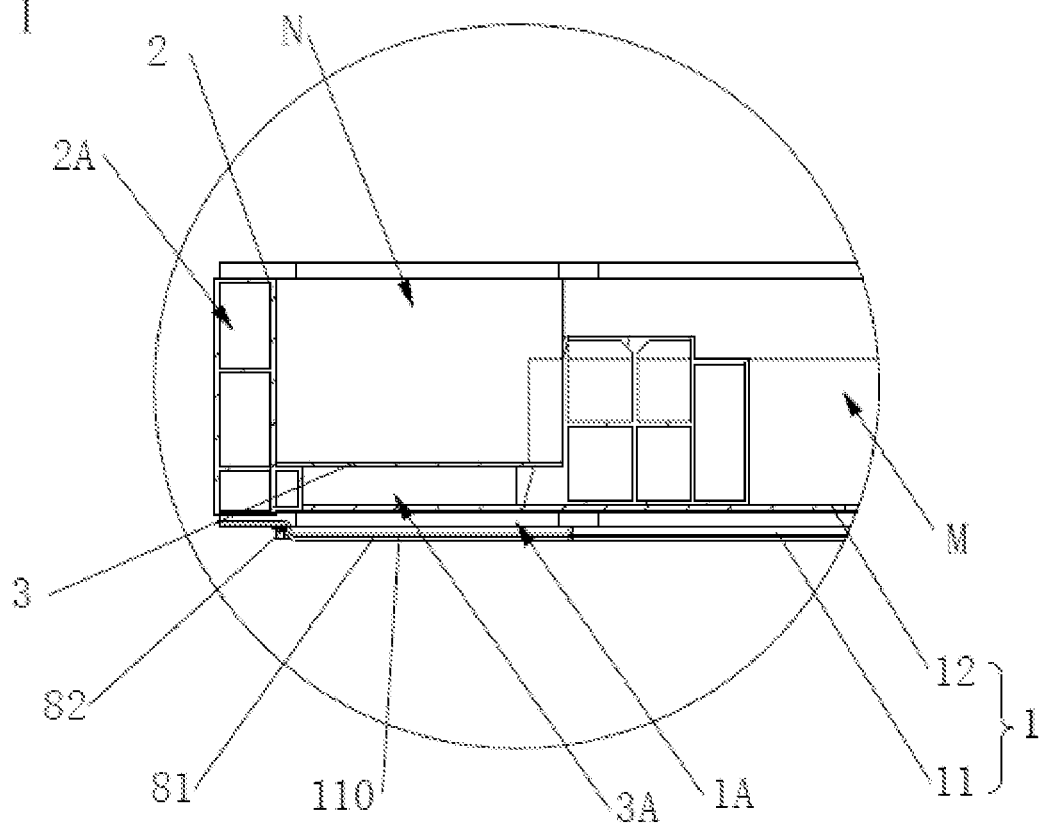
FIG. 4 is a schematic enlarged diagram of part I of FIG. 3.
Figure 5:
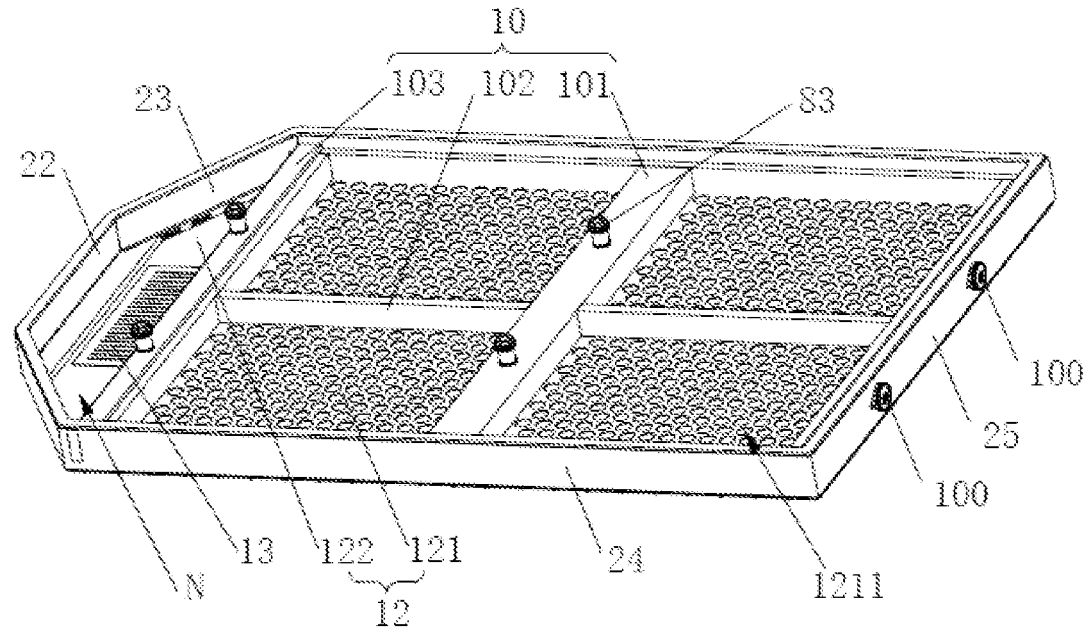
FIG. 5 is a schematic structural diagram of a part of a battery pack provided by the embodiment of the present application in another viewing.

As shown in FIGS. 3 to 5, the battery pack further includes an electrical component. The frame assembly 10 includes a second crossbeam 103. The second crossbeam 103 divides the accommodating cavity into a first area M and a second area N. The at least two installation areas are disposed in the first area M, and the electrical component is disposed in the second area N. The second area N is located in front of the first area M. The second crossbeam 103 separates the battery cell group 9 from the electrical component to prevent the battery cell 91 out of control from destructing the electrical component and affecting control system, and the like.

As shown in FIGS. 3 to 5, the frame assembly 10 includes one or more first crossbeams 101. When one first crossbeam 101 is provided, the accommodating cavity is divided into two installation areas. When a plurality of the first crossbeams 101 is provided and spaced parallel to each other, the accommodating cavity is divided into a plurality of installation areas to prevent thermal runaway of the battery cell 91 in one battery cell group 9 from destructing other battery cell group 9. The plurality of first crossbeams 101 divides the first area M into a plurality of installation areas arranged in a row or a column. The first crossbeam 101 and the second crossbeam 103 may be arranged parallel or perpendicularly thereto, or may be arranged at an angle, which are not limited in the embodiment.

As shown in FIG. 5, the frame assembly 10 further includes a longitudinal beam 102, the longitudinal beam 102 and the first crossbeam 101 define a cross beam, and the cross beam divides the accommodating cavity into a plurality of installation areas. In the embodiment, the cross beam divides the first area M into four installation areas, thus improving structural strength. In other embodiments, a plurality of cross beams may also be provided, and the first area M may be divided into eight installation areas or more. The cross beam improves structural strength of the battery casing.

As shown in FIG. 5, the first crossbeam 101 is connected to the base plate assembly 1 and the side beam assembly 2 through the fixing part 83, thereby improving structural strength. The fixing part 83 may be a combination of a screw rod and a nut. The screw rod passes through the base plate assembly 1 and the first crossbeam 101. The nut abuts against a side of the base plate assembly 1 away from the first crossbeam 101. In an embodiment, the longitudinal beam 102 and the second crossbeam 103 may be connected to the base plate assembly 1 through the fixing part 83.

As shown in FIG. 1, the battery pack further includes a wiring harness module 7 disposed on a side of the battery cell group 9 away from the base plate assembly 1. The wire harness module 7 is electrically connected to the battery cell group 9. The wiring harness module 7 includes a bus bar and the like, and the bus bar is connected to an adjacent battery cell 91 in series or in parallel. As shown in FIG. 1, the battery pack further includes a liquid cooling plate 6 configured to cool the battery cell 91. The liquid cooling plate 6 is disposed on a side of the battery cell group 9 away from the base plate assembly 1. That is, the liquid cooling plate 6 is disposed on a top of the battery cell 91. Owe to the liquid cooling plate 6, a better and effective heat conduction is provided in a height direction of the battery cells 91, thus, cooling effect is improved. In an embodiment, the liquid cooling plate 6 is a whole plate, and is disposed on tops of the plurality of battery cell groups 9 and the electrical component, thereby simplifying layout and facilitating assembly. In an embodiment, the liquid cooling plate 6 is disposed in the battery casing, and a shape of the liquid cooling plate 6 matches a shape of the base plate assembly 1. The liquid cooling plate 6 is bonded to a side of the wire harness module 7 away from the battery packs 9, which increases rigidity and strength of the battery pack.

As shown in FIGS. 2 to 5, the accommodating cavity is divided into a first area M and a second area N. The first area M includes a plurality of installation areas. A support plate 3 is disposed in the second area N. The bottom plate assembly 1 includes an outer plate 11 and an inner plate 12. The outer plate 11 and the inner plate 12 define a first pressure relief cavity 1A. The battery cell 91 in the battery cell group 9 seal a part of cavity wall of the first pressure relief cavity 1A. The support plate 3 and the inner plate 12 define a second pressure relief cavity 3A. The other part of the cavity walls of the first pressure relief cavity 1A is communicated with the second pressure relief cavity 3A. An inner cavity of the side beam assembly 2 defines a third pressure relief cavity 2A, the second pressure relief cavity 3A is communicated with the third pressure relief cavity 2A, and a pressure relief valve 100 communicated the third pressure relief cavity 2A is disposed on the side beam assembly 2.

When thermal runaway occurs in one or more battery cells 91, high-temperature substances are discharged from the one or more battery cells 91 and diffused in the first pressure relief cavity 1A. A first pressure relief layer formed by the first pressure relief cavity 1A separates from a battery cell layer where the battery cells 91 are disposed, so as to ensure that other battery cells 91 in a layer on the inner plate 12 will not be affected during the pressure relief, thereby preventing other battery cells 91 from being affected. The first pressure relief cavity 1A, the second pressure relief cavity 3A and the third pressure relief cavity 2A define a pressure relief channel. After the high-temperature substances passing through the pressure relief channel, pressure is relieved through the pressure relief valve 100. The high-temperature substances pass through the first pressure relief cavity 1A, the second pressure relief cavity 3A, and the third pressure relief cavity 2A. A large amount of heat is taken away, and the high-temperature substances are cooled by three times. When the high-temperature substances arrives at the pressure relief valve 100 of the battery casing, a temperature of the high-temperature substances is already below an ignition point to fire, and it is more safety and reliable.

As shown in FIG. 5, the inner plate 12 includes a carrier board 121 and a partition board, and the battery cells 91 seal on a side of a plurality of first through-hole 1211 of the carrier board 121. When a thermal runaway occurs in one or more battery cells 91, the high-temperature substances discharged therefrom enter the first pressure relief cavity 1A through the first through-hole 1211 and diffuse in the first pressure relief cavity 1A. The first pressure relief cavity 1A is separated from the other battery cells 91 of the battery cell group 9. In the embodiment, the battery cell 91 are cylindrical battery cell, and the first through-hole 1211 is circular holes. An area of a bottom of the cylindrical cell is not less than an area of cross-sectional of the first through-hole 1211 to ensure that the high-temperature substances can enter the first pressure relief cavity 1A as much as possible, to avoid leakage and influence on other battery cells 91. The carrier board 121 is provided with a plurality of first through-holes 1211, and the plurality of first through-holes 1211 are arranged in forms of multiple rows or in a matrix and the like, which makes the carrier board 121 a honeycomb plate.

In other embodiments, the battery cell 91 may also be square battery cell or the like, and structures such as the carrier board 121 and the first through-hole 1211 may be designed accordingly, which is not limited in the embodiment.

The partition plate 122 and the support plate 3 define the second pressure relief cavity 3A, the first pressure relief cavity 1A is communicated with the second pressure relief cavity 3A via a second through-hole provided in the partition plate 122. A filter screen plate is disposed on the second through-hole provided in the partition plate 122. A plurality of small holes are provided in the filter screen plate to prevent large particles from entering the second pressure relief cavity 3A. The high-temperature substances discharged from the battery cells 91 are prevented from blocking the pressure relief channel and causing an unsmooth pressure relief. The high-temperature substances are filtered by the filter screen plate, and the filter screen plate may be replaced regularly. In the embodiment, a phase change material layer is attached to the filter screen plate, and the phase change material layer can cool down the high-temperature substances.

The outer plate 11 is a steel plate having a high melting point, and is not easy to melt. The outer plate 11 can cool the high-temperature substances.

Figure 6:
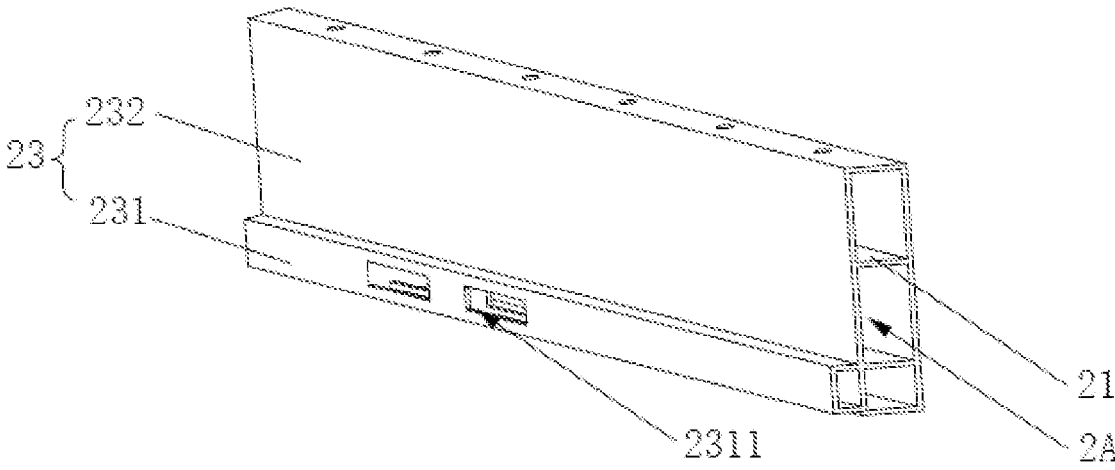
FIG. 6 is a schematic structural diagram of a second side beam of a battery pack provided by the embodiment of the present application.

As shown in FIG. 6, a plurality of partition walls 21 are disposed in the third pressure relief cavity 2A to divide the third pressure relief cavity 2A into a plurality of cavities communicated with each other. The plurality of partition walls 21 may be arranged in parallel and spaced from each other to define an S-shaped cavity. Optionally, the plurality of partition walls 21 may be spaced from each other and included with an angle therebetween to define a plurality of cavities. Holes are defined in the partition wall 21 to communicate the plurality of cavities. Optionally, the plurality of partition walls 21 are provided with different shapes, for example, a T-shape, a L-shape, a concave shape, and a continue with a number of T-shape and a L-shape, so that the third pressure relief cavity 2A is defined as a "Maze" cavity structure. Constructions, shapes and assembly of the partition walls 21 may refer to relevant references to define a simple or complex maze, which is not limited in the embodiment. When the high-temperature substances flow in the third pressure relief cavity 2A, the temperature of the high-temperature substances is decreased by increasing a length of the third pressure relief cavity 2A and prolonging a pressure relief time.

As shown in FIGS. 5 and 6, a cross section of the second area N is shaped as an isosceles trapezoid. The side beam assembly 2 includes a first side beam 22 and two second side beams 23, the two second side beams 23 are symmetrically connected to two ends of the first side beam 22, respectively. A pressure relief hole 2311 is provided in the second side beam 23. The second pressure relief cavity 3A and the third pressure relief cavity 2A are communicated with each other through the pressure relief hole 2311. By defining the pressure relief hole 2311 in the two second side beam 23 symmetrical to each other, the high-temperature substances are output from the two second side beams 23, so that the high-temperature substances are dispersed, which is conducive to temperature decreasing.

As shown in FIG. 6, a cross section of the second side beam 23 is L-shaped and the second side beam 23 includes a horizontal side beam 231 and a vertical side beam 232. The horizontal side beam 231 is located in the second area N. The second pressure relief cavity 3A is communicated with the horizontal side beam 231. By providing the L-shaped side beam assembly 2, a length of the third pressure relief cavity 2A is extended. In the embodiment, a plurality of cavities arranged in a horizontal direction are defined in the horizontal side beam 231, and a plurality of cavities arranged in a vertical direction are defined in the vertical side beam 232. A plurality of openings are provided in the partition walls 21 to communicate the cavities.

The two second side beams 23 are symmetrical along a symmetrical plane of the battery pack, and two pressure relief valves 100 are provided. The two pressure relief valves 100 are disposed on the side beam assembly 2 on a side of the first area M away from the second area N to extend a flow path of the high-temperature substances. The two pressure relief valves 100 are symmetrical along the symmetrical plane, that is, the two pressure relief valves 100 are symmetrical to a same symmetrical plane with the two side beams 23, which reduces the relief pressure of the pressure relief valves 100 and improves reliability.

As shown in FIG. 5, the side beam assembly 2 further includes a fourth side beam 25 parallel to the first side beam 22, a third side beam 24 connecting the second side beam 23 and the fourth side beam 25. The pressure relief valves 100 are disposed on the fourth side beam 25. A flow path of the high-temperature substances in the third pressure relief cavity 2A is defined by the second side beam 23, the third side beam 24, the fourth side beam 25 and the pressure relief valve 100 on a same side.

As shown in FIG. 4, the battery casing further includes an installation strip 81 and a fastener 82. The fastener 82 penetrates through the installation strip 81, the base plate assembly 1, and the side beam assembly 2 sequentially to connect the installation strip 81, the base plate assembly 1, and the side beam assembly 2.

Figure 7:
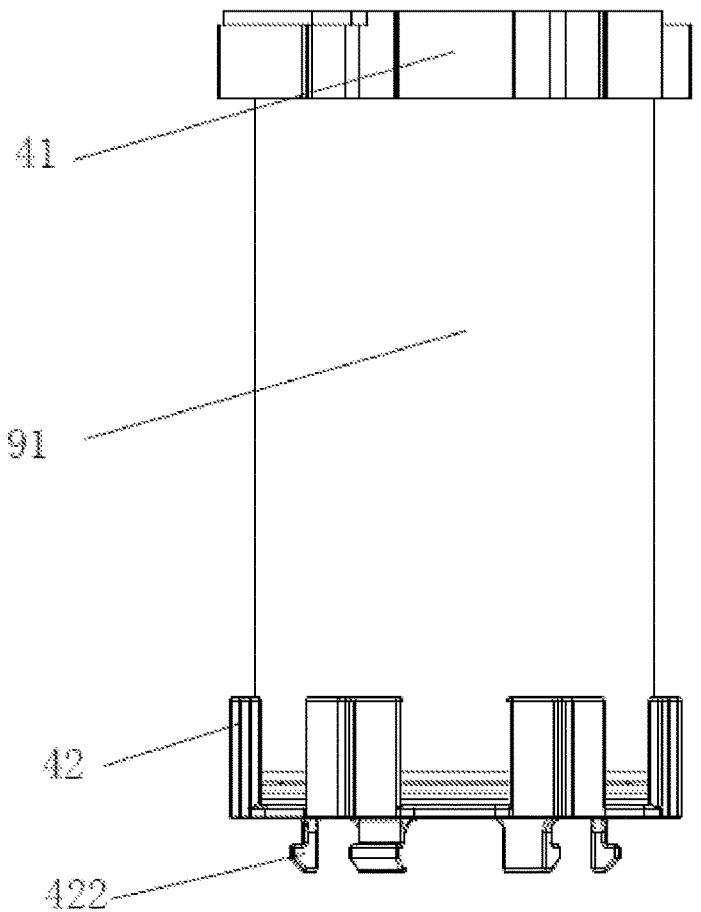
FIG. 7 is a schematic assembled diagram of a battery cell and an installation base assembly provided by the embodiment of the present application.
Figure 8:
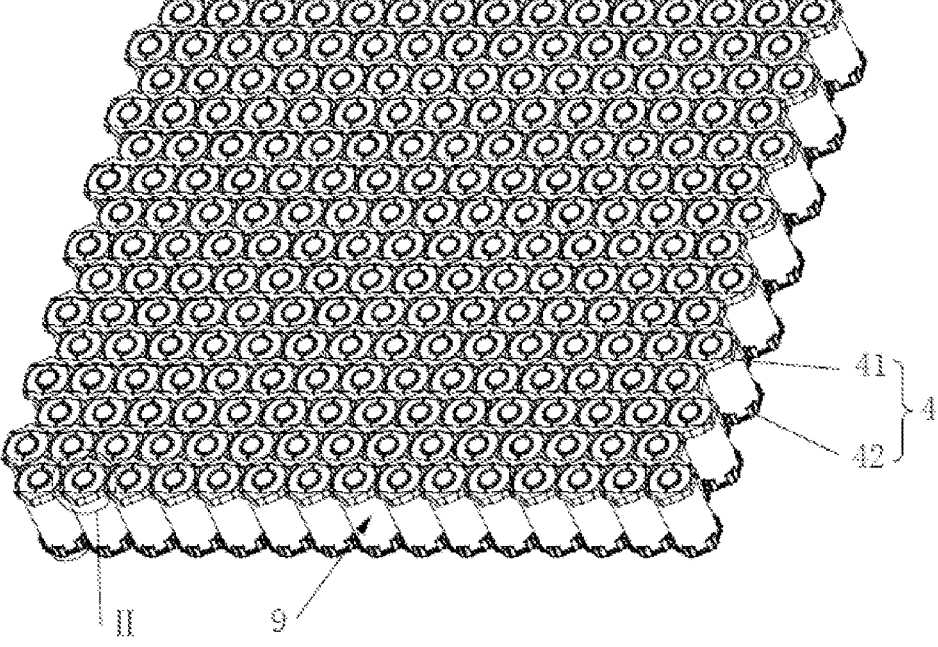
FIG. 8 is a schematic assembled diagram of a battery cell group and an installation base assembly corresponding thereto provided by the embodiment of the present application.

As shown in FIGS. 1, 7, and 8, the battery pack further includes an installation base assembly 4. Each battery cell 91 in the battery cell group 9 is disposed on the base plate assembly 1 through the installation base assembly 4. The plurality of battery cells 91 are organized into groups and can be assembly together, which has a strong compatibility and an easy installation. The plurality of battery cells 91 is disposed on the base plate assembly 1 through the installation base assembly 4. The number of the battery cells 91 and the number of the installation base assemblies 4 may be determined based on a capacity of the battery pack, a size and a shape of the base plate assembly 1. The plurality of battery cells 91 may be combined in series connection or parallel connection. A more flexible combination and a stronger compatibility are provided.

As shown in FIGS. 7 to 11, the installation base assembly 4 includes a lower cover 42, a limiting groove 421 configured to accommodate the battery cell 91 is provided in the lower cover 42. The battery cell 91 is fixed into the limiting groove 421. The limiting groove 421 is configured for positioning the battery cell 91 to improve the positioning accuracy. A connecting portion is provided on a side of the lower cover 42 away from the battery cell 91, and the lower cover 42 is fixed to the base plate assembly 1 through the connecting portion. The connection reliability between the battery cell 91 and the base plate assembly 1 is improved. The lower cover 42 is small in size, easy to manufacture and install, which saves costs.

As shown in FIGS. 1, and 7 to 9, the battery pack further includes a wire harness module 7. A first electrode 911 and a second electrode 912 of the battery cell 91 are located on a same side of the battery cell 91. The installation base assembly 4 further includes an upper cover 41 arranged opposite to the lower cover 42. The upper cover 41 is disposed on a side of the battery cell 91 where the first electrode 911 and the second electrode 912 are disposed. The first electrode 911 and the second electrode 912 are exposed from the upper cover 41 to connect the wire harness module 7.

During assembly, an end of the battery cell 91 is connected to the upper cover 41, and another end of the battery cell 91 is connected to the lower cover 42. For description, the battery cell 91 is provided with the upper cover 41 and the lower cover 42 to define a battery cell assembly, which is simple in structure and easy in assembly. When the battery cell group 9 includes a plurality of battery cells 91, a plurality of installation base assemblies 4 corresponding to the battery cells 91 are meanwhile provided, thereby assembling together to define a plurality of battery cell assemblies. The battery cell assemblies are then fixed on the base plate assembly 1 through the lower cover 42 to improve the connection reliability. The battery cell assemblies may be assembled with each other in series or parallel, and the installation base assemblies 4 are provided based on the number of the battery cells 91 in the battery cell groups 9. It provides a stronger compatibility and an easy installation. It is unnecessary to customize the installation base assemblies 4 based on types of the battery modules, thus saving costs. In an embodiment, the upper cover 41 and the lower cover 42 may be made based on a type of the battery cell 91. Battery cells 91 of a same type applies with the upper cover 41 and the lower cover 42 corresponding to this same type. Batch production can be performed to reduce costs and shorten the production period. The upper cover 41 and the lower cover 42 are configured to protect and limit the battery cell 91, so as to improve the reliability of installation in the battery casing.

The upper cover 41 is a plastic cover, and the lower cover 42 is a plastic seat. The upper cover 41 and the lower cover

42 are insulated to avoid short circuit between different battery cells 91, thus improving safety and reliability.

Figure 9:
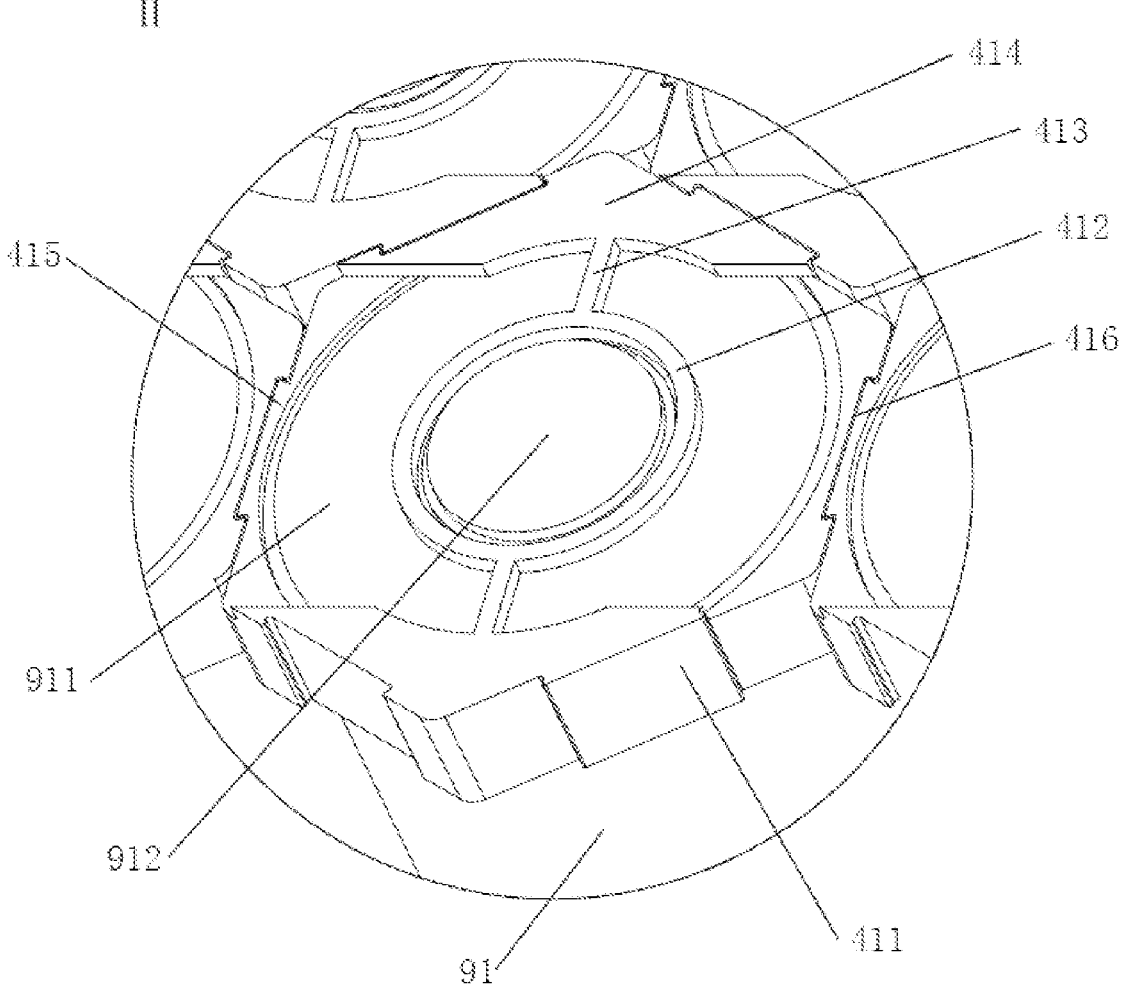
FIG. 9 is a schematic enlarged diagram of part II of FIG. 8.

In the embodiment, as shown in FIG. 9, the first electrode 911 is a negative electrode, and the second electrode 912 is a positive electrode. In other embodiments, the first electrode 911 may also be a positive electrode, and the second electrode 912 may be a negative electrode.

As shown in FIG. 9, the second electrode 912 protrudes from the first electrode 911. The upper cover 41 includes a first annular sleeve 411, and the second annular sleeve 412 connected to the first annular sleeve 411 at an opening on an end. The first annular sleeve 411 is sleeved on outer periphery of the battery cell 91. The first annular sleeve 411 is configured to limit the battery cell 91 in a peripheral direction. The second annular sleeve 412 is sleeved on the second electrode 912 to avoid short circuit between the first electrode 911 and the second electrode 912 of a same battery cell 91. The first electrode 911 is exposed from the end opening of the first annular sleeve 411, and the second electrode 912 is exposed from an end opening of the second annular sleeve 412. By sleeving the two electrodes of the battery cell 91 with the first annular sleeve 411 and the second annular sleeve 412, short circuit is avoided when the wire harness module 7 is connected to electrodes of the battery cell 91.

The battery cell 91 is a cylindrical battery cell. An inner wall of the first annular sleeve 411 is cylindrical. A shape of the inner wall of the first annular sleeve 411 is adapted to a shape of the cylindrical battery cell to improve the connection reliability and prevent shaking therebetween. When the battery cell 91 is in other shapes, the shape of the inner wall of the first annular sleeve 411 is adaptively configured according to the shape of the battery cell 91. In an embodiment, the second electrode 912 is cylindrical, and the inner wall of the second annular sleeve 412 is cylindrical.

As shown in FIG. 9, a baffle 414 is provided at an end of the first annular sleeve 411 to limit the battery cell 91 in a direction towards the lower cover 42. In the embodiment, the battery cell 91 is a cylindrical battery cell. The baffle 414 is configured to limit the battery cell 91 in an axial direction. The second annular sleeve 412 is connected to the baffle 414 through a connection board 413. The connection board 413 and the baffle 414 may abut against a part of the first electrode 911, and another part of the first electrode 911 is exposed.

Adjacent two upper covers 41 may be snapped together to improve the connection reliability between different battery cell assemblies, thereby improving the connection reliability of different battery cells 91 in a same battery cell group 9.

As shown in FIG. 9, a second buckle 415 and a second clamp slot 416 are provided on a peripheral side of the first annular sleeve 411. The second buckle 415 of a first one of the upper covers 41 may be snapped with the second clamp slot 416 of an upper cover 41 adjacent to the first one. The second clamp slot 416 of a first one of the first upper covers 41 may be snapped with the second buckle 415 of the upper covers 41 adjacent to the first one. Adjacent battery cells 91 may be detached from each other through their upper covers 41, which improves the connection reliability between different battery cells 91 and prevents short circuit. The second buckle 415 protrudes from a peripheral surface of the first annular sleeve 411 along a radial direction, and the second clamp slot 416 is recessed from the peripheral surface of the first annular sleeve 411 along a radial direction.

The second buckle 415 and the second clamp slot 416 are disposed oppositely. When the plurality of battery cells 91 are arranged in rows, the second buckle 415 and the second clamp slot 416 are respectively connected to the upper cover 41 of adjacent battery cell 91 in a same row, which improves the connection reliability of the battery cells 91 in a same row.

The second buckle 415 and the second clamp slot 416 may be provided in one or two pairs. If the second buckle 415 and the second clamp slot 416 is provided in two pairs, and the second buckle 415 and the second clamp slot 416 of each pair are disposed oppositely, the two pairs are spaced to connect adjacent two battery cells 91 in a same row the upper covers 41, meanwhile connecting adjacent two battery cells 91 in a same column through the upper covers 41. The connection reliability between rows and columns of battery cells 91 is improved. Three or more pairs of second buckle 415 and second clamp slot 416 may be provided. In the embodiment, as shown in FIG. 9, a shape of a cross section of an outer periphery of the upper cover 41 is hexagonal, and three pairs of second buckle 415 and clamp slot 416 are arranged around the outer periphery to clamp with adjacent upper covers 41. Six side surfaces of the upper cover 41 are connected with adjacent upper covers 41 respectively, which provides a higher density in installation.

Figures 10, 11:
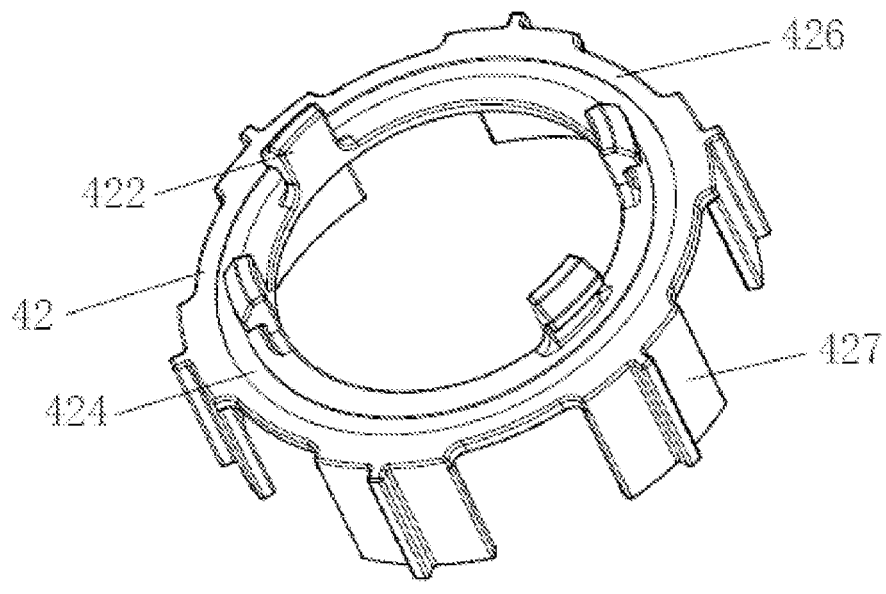
FIG. 10 is a schematic structural diagram of a lower cover provided by the embodiment of the present application in a viewing.
FIG. 11 is a schematic structural diagram of a lower cover provided by the embodiment of the present application in another viewing.

As shown in FIG. 10, the lower cover 42 is provided with either a first buckle 422 or a first groove, and the base plate assembly 1 is provided with either a first groove or a first buckle 422. The first buckle 422 is clamped with the first groove, which improves the connection reliability of the lower cover 42 and the base plate assembly 1, and thus improving the connection reliability of the battery cell 91 in the battery casing. At the same time, the first buckle 422 and the first groove provides a detachable connection for an easy disassembly and assembly. In the embodiment, as shown in FIGS. 10 and 11, the first buckle 422 is disposed at a bottom of the lower cover 42, a first groove is provided in the base plate assembly 1, and the first buckle 422 is clamped with the first groove to conveniently insert the lower cover 42 into the base plate assembly 1 for installation.

The base plate assembly 1 includes a carrier board 121, and the lower cover 42 is disposed on the carrier board 121. A bottom of the limiting groove 421 has an open space, through which the battery cell 91 may be communicated with the first pressure relief cavity 1A. The carrier board 121 is a honeycomb plate, and the first groove is arranged around an outer periphery of the first through-hole 1211.

A first adhesive storage groove 423 is provided in an inner wall of the limiting groove 421. The battery cell 91 is bonded in the limiting groove 421 with the structural adhesive filled in the first adhesive storage groove 423, which makes the installation between the battery cell 91 and the lower cover 42 more reliable. As shown in FIG. 11, the first adhesive storage groove 423 is provided on a bottom wall of the limiting groove 421. In an embodiment, a second adhesive storage groove 424 is provided on a side of the lower cover 42 away from the battery cell 91. The lower cover 42 is bonded to the base plate assembly 1 with the structural adhesive filled in the second adhesive storage groove 424, which makes the installation between the lower cover 42 and the base plate assembly 1 more reliable. In the embodiment, as shown in FIG. 10, the second adhesive storage groove 424 is provided at a bottom of the lower cover 42. In the embodiment, the second adhesive storage groove 424 is provided in the lower cover 42, and structural adhesive filled in the second adhesive storage groove 424 bonds the lower cover 42 to the carrier board 121. The lower cover 42 is more firmly fixed with the carrier board 121. In other embodiments, the carrier board 121 may be provided with an accommodating groove, the lower cover 42 is arranged in the accommodating groove, the accommodating groove may position the lower cover 42 and the battery cell 91 with the lower cover 42. The first clamp slot, the first buckle and other structures may be adaptively designed, which is not limited in this embodiment.

As shown in FIG. 10, the lower cover 42 includes a bottom plate 426, and a plurality of side plates 427 disposed around an outer periphery of the bottom plate 426. The plurality of side plates 427 are space from each other. The bottom plate 426 and the plurality of side plates 427 define the limiting groove 421 to reduce the weight of the lower cover 42. A limiting protrusion 425 is provided on the outer peripheral surface of the side plate 427. The limiting protrusion 425 of the lower cover 42 abuts against the limiting protrusion 425 of the adjacent lower cover 42 to provide a peripheral position.

What is claimed is:

1. A battery pack, comprising:
a base plate assembly;
a side beam assembly, wherein the side beam assembly is disposed at an outer periphery of the base plate assembly, the side beam assembly and the base plate assembly define an accommodating cavity, and the accommodating cavity comprises at least one installation area;
at least one battery cell group, wherein the installation area is provided with the battery cell group, the battery cell group comprises a plurality of battery cells, and each of the plurality of battery cells is fixedly disposed on the base plate assembly;
further comprising a plurality of installation base assemblies, and each of the battery cell is disposed on the base plate assembly through a corresponding one of the plurality of installation base assemblies;
wherein each of the plurality of the installation base assemblies comprises a lower cover, the lower cover has a limiting groove configured to accommodate the battery cell, a connecting portion is provided on a side of the lower cover away from the battery cell, and the lower cover is fixedly disposed on the base plate assembly through the connecting portion; and
wherein the lower cover is provided with one of a first buckle or a first groove, the base plate assembly is provided with another one of the first groove or the first buckle, and the first buckle is clamped with the first groove so that the battery cell is detachably connected to the base plate assembly.

2. The battery pack of claim 1, wherein the frame assembly comprises at least one first crossbeam, and a plurality of crossbeams are arranged in parallel and spaced from each other to divide the accommodating cavity into a plurality of installation areas.

3. The battery pack of claim 2, wherein the frame assembly further comprises a longitudinal beam, the longitudinal beam and the at least one first crossbeam define a cross beam, and the cross beam is configured to divide the accommodating cavity into the plurality of installation areas.

4. The battery pack of claim 1, further comprising a wire harness module disposed on a side of the battery cell group away from the base plate assembly, and the wire harness module is electrically connected to the battery cell group.

5. The battery pack of claim 4, further comprising a liquid cooling plate, and the liquid cooling plate is bonded to a side of the wire harness module away from the battery cell group.

6. The battery pack of claim 1, wherein the accommodating cavity is divided into a first area and a second area, the first area comprises a plurality of installation areas, and a support plate is disposed on the second area;

the base plate assembly comprises an outer plate and an inner plate, the outer plate and the inner plate define a first pressure relief cavity, and the battery cell of the battery cell group seal a part of a cavity wall of the first pressure relief cavity;

the support plate and the inner plate define a second pressure relief cavity, and the second pressure relief cavity is communicated with another part of the cavity wall of the first pressure relief cavity; and an inner cavity of the side beam assembly defines a third pressure relief cavity, the second pressure relief cavity is communicated with the third pressure relief cavity, and a pressure relief valve communicated the third pressure relief cavity is disposed on the side beam assembly.

7. The battery pack of claim 6, wherein the inner plate comprises a carrier board and a partition plate, and the battery cell seals on a side of a first through-hole provided in the carrier board; the partition plate and the support plate define the second pressure relief cavity, and the second pressure relief cavity is communicated with the first pressure relief cavity via a second through-hole provided in the partition plate; wherein the carrier board is arranged in the first area, and the partition plate is arranged in the second area.

8. The battery pack of claim 7, wherein a filter screen plate is disposed on the second through-hole provided in the partition plate.

9. The battery pack of claim 6, wherein a partition wall is disposed in the third pressure relief cavity, and the plurality partition wall is configured to divide the third pressure relief cavity into a plurality of cavities communicated with each other.

10. The battery pack of claim 1, wherein the lower cover comprises at least one of a first adhesive storage groove disposed on a side of the lower cover close to the battery cell and a second adhesive storage groove disposed on a side of the lower cover away from the battery cell, wherein the first adhesive storage groove is configured to accommodate a first structural adhesive, and the battery cell is bonded to the lower cover through the first structural adhesive; and wherein the second adhesive storage groove is configured to accommodate a second structural adhesive, and the lower cover is bonded to the base plate assembly through the second structural adhesive.

11. The battery pack of claim 1, wherein the base plate assembly comprises a carrier plate, and the lower cover is disposed on the carrier plate.

12. The battery pack of claim 1, wherein a first electrode and a second electrode of the battery cell are disposed on a same side of the battery cell; and the installation base assembly further comprises an upper cover arranged opposite to the lower cover, the upper cover is disposed on a side of the battery cell where the first electrode and the second electrode are disposed, the first electrode and the second electrode are exposed from the upper cover to connect a wire harness module in the battery pack.

13. The battery pack of claim 12, wherein the upper cover is snapped with the upper cover adjacent thereto.

14. The battery pack of claim 1, further comprising a frame assembly disposed in the accommodating cavity, the frame assembly comprises at least one first crossbeam, and a plurality of crossbeams are arranged in parallel and spaced from each other to divide the accommodating cavity into a plurality of installation areas; and wherein a support plate is disposed on the second area;

the base plate assembly comprises an outer plate and an inner plate, the outer plate and the inner plate define a first pressure relief cavity, and the battery cell of the battery cell group seal a part of a cavity wall of the first pressure relief cavity;

the support plate and the inner plate define a second pressure relief cavity, and the second pressure relief cavity is communicated with another part of the cavity wall of the first pressure relief cavity; and an inner cavity of the side beam assembly defines a third pressure relief cavity, the second pressure relief cavity is communicated with the third pressure relief cavity, and a pressure relief valve communicated the third pressure relief cavity is disposed on the side beam assembly.

15. The battery pack of claim 1, further comprising a frame assembly disposed in the accommodating cavity, the frame assembly comprises at least one first crossbeam, and a plurality of crossbeams are arranged in parallel and spaced from each other to divide the accommodating cavity into a plurality of installation areas;

the frame assembly further comprises a longitudinal beam, the longitudinal beam and the at least one first crossbeam define a cross beam, and the cross beam is configured to divide the accommodating cavity into the plurality of installation areas; and wherein a support plate is disposed on the second area;

the base plate assembly comprises an outer plate and an inner plate, the outer plate and the inner plate define a first pressure relief cavity, and the battery cell of the battery cell group seal a part of a cavity wall of the first pressure relief cavity;

the support plate and the inner plate define a second pressure relief cavity, and the second pressure relief cavity is communicated with another part of the cavity wall of the first pressure relief cavity; and an inner cavity of the side beam assembly defines a third pressure relief cavity, the second pressure relief cavity is communicated with the third pressure relief cavity, and a pressure relief valve communicated the third pressure relief cavity is disposed on the side beam assembly.

16. The battery pack of claim 1, further comprising a frame assembly disposed in the accommodating cavity and configured to divide the accommodating cavity into at least two installation areas.

17. The battery pack of claim 16, further comprising an electrical component, wherein the frame assembly comprises a second crossbeam, and the second crossbeam divides the accommodating cavity into a first area and a second area, the at least two installation areas are provided in the first area, and the electrical component is disposed in the second area.

18. A vehicle, comprising the battery pack of claim 1.

* * * * *